United States Patent [19]

Ueda et al.

[11] 4,321,520
[45] Mar. 23, 1982

[54] ELECTRONIC TIMEPIECE

[75] Inventors: Makoto Ueda; Akira Torisawa; Shuji Otawa; Masaaki Mandai; Masaharu Shida; Katsuhiko Sato, all of Tokyo, Japan

[73] Assignee: Kabushiki Kaisha Daini Seikosha, Tokyo, Japan

[21] Appl. No.: 49,974

[22] Filed: Jun. 19, 1979

[30] Foreign Application Priority Data

Jul. 19, 1978 [JP] Japan .................................. 53/88054

[51] Int. Cl.³ .............................................. G05B 19/40
[52] U.S. Cl. ................................... 318/696; 318/647; 368/204; 368/202; 368/11
[58] Field of Search .................... 318/647, 696, 685; 368/10, 11, 204, 202

[56] References Cited

U.S. PATENT DOCUMENTS 3,756,010 9/1973 Kimura et al. .................... 368/204
4,158,287 6/1979 Nakajima et al. .................. 368/204

Primary Examiner—J. V. Truhe
Assistant Examiner—Eugene S. Indyk
Attorney, Agent, or Firm—Robert E. Burns; Emmanuel J. Lobato; Bruce L. Adams

[57] ABSTRACT

An electronic timepiece includes a stepping motor having a stator, a drive coil and a rotor which is driven in one of at least two different states. The state of the driving motor is changed in response to a change in the load of the motor or in response to the locating of the motor in an external magnetic field.

11 Claims, 22 Drawing Figures

ELECTRONIC TIMEPIECE

BACKGROUND OF THE INVENTION

This invention relates to a driving system of a step motor principally for an electronic watch. For a step motor such as ultra-small-sized one for an electronic watch, for which a low power consumption is required, a correction drive system is devised, as a method for low-power consumption, which drives with low electric power in a normal state, and does a correction drive with bigger electric power than a normal state when a rotor does not rotate normally by a certain reason, in order to improve an electro-mechanical transducing efficiency of the step motor itself.

When this correction drive system is adopted, it is important how to detect a rotation state and non-rotation state of the rotor and how to defend the rotor from stopping in outer conditions such as magnetic field.

FIG. 1 (A) shows a step motor used for an operation of an electronic timepiece and which is used in this invention, too.

FIG. 1 (B) is a sample of an inverted pulse used to drive a step motor of the conventional type.

By applying a driving pulse of FIG. 1 (B) to a coil 3, a stator 1 is magnetized and a rotor is rotated in 180° by a repulsion and a attraction of a rotor 2 and magnetic poles.

In the conventional motor, a width of an impressed driving pulse is selected one which ensures an output of a motor in any condition which must be filled as a timepiece. However, in this method, a surplus for a calendar-load, the internal resistance of a battery, and a voltage-drop at the end of battery life must be provided and drive has to be carried with a pulse-width having a surplus width. For that, by improving this method, another method is proposed, by which a step motor is driven in the normal state by a pulse-width without any surplus, a detecting circuit is used which judges the rotation state and non-rotation state of the rotor and a correction drive with a correction pulse width is executed only when the rotor state is judged to be "non-rotation".

A method of judging rotation and non-rotation of a rotor by taking into account the characteristic that there is a difference in the generation of electricity between the rotation state and the non-rotation state is used because of the difficulty of mounting a detector on the outside which performs a detection of the rotation and non-rotation of this rotor because of requirements such as cost, miniaturization and a reduction of thickness of a watch.

FIG. 3 shows a current waveform of a conventional step motor. In FIG. 3, a section "a" is the time when a driving pulse is impressed, and "b" is the time when a current is generated after impression of a driving pulse owing to an induced current made by a vibration of the rotor. The waveform "$b_1$" shown in FIG. 3 is one in the case of rotation of the rotor, and "$b_2$" is a waveform when the rotor does not rotate.

A driving circuit in this case is described in FIG. 4 (A) and numerals 4 and 5 are inverters which consist of N-channel field effect transistors and P-channel field effect transistor, and a coil 3 connected to an output thereof. After being impressed with a driving pulse, the coil 3 is changed to a short condition by the transistors which compose the inverter. Then, a current flows in the time shown by "b" in the FIG. 3 by the vibration of the rotor. In FIG. 3, "$b_1$" is a waveform in the rotation state and $b_2$ is a waveform in the non-rotation state, showing a voltage which is of the product of the ON-resistance of a driving transistor and the current of a vibration of the rotor.

This generated voltage is converted into a voltage in the same sense via a transmission gate TG. Then, a comparison of a base voltage and peak voltage is carried out by a voltage comparator, rotation and non-rotation of the rotor are judged and when the rotor is judged "non-rotation", a correction drive is executed. But in this method, when an electronic timepiece is placed in an alternating current magnetic field, such as an external magnetic field, it induces a voltage in a coil, and said voltage acts as an external noise which is added to a detecting signal, when rotation and non-rotation of the rotor is judged by an induced voltage made by rotor's movement.

For that reason, detection mistakes happen as do mistakes of the movement of the rotor, that is, the timepiece gets out of order. FIG. 5 is a graph of an alternating current magnetic field proof characteristic against a driving pulse-width of a step motor.

As a low electric power consumption is required for an electronic timepiece, the driving pulse-width is set forth as short as possible. The magnetic proof characteristic for this normal driving pulse is this made worse, therefore, in order to use this correction driving system for a watch and to obtain the anti-magnetic characteristic, the magnetic proof structure must be more severe than before. Although, saving of current is possible, it's necessary to add a shield plate for the magnetic proof structure, which is an abstraction for the miniaturization and causes high-cost.

SUMMARY OF THE INVENTION

This invention aims to eliminate the defects of the conventional correction driving system which used a normal driving pulse-width by which a timepiece is stopped in a magnetic field. According to this invention, the entering of a timepiece in a magnetic field is detected and the step motor is driven with a pulse-width which is strong with respect to the external magnetic field. Further, this invention aims to obtain an anti-magnetic characteristic which is more strong than that of a driving system using a fixed pulse.

In this invention, a voltage which is induced in a coil 3 is detected in the period when the rotor does not rotate, that is, in the section of a driving pulse width "a" of FIG. 3 and in the time excepting the section b, that is, from the beginning of the decrease of vibration of the rotor until the stop of the current. And when a signal is detected, the entering of the timepiece in a magnetic field is recognized, and a pulse width is fixed so that the rotor is hard to stop, and then, the anti-magnetic characteristic is improved.

The characteristic of this invention is recognized in the detection of a voltage induced in a coil of a step motor without using an addition element for detecting a magnetic field, such as a Hall-effect element or an element of magnetic resistance. Referring now to a voltage induced in a coil 3 when the step motor is placed in an alternate magnetic field.

BRIEF DESCRIPTION OF THE DRAWINGS

FIG. 16 (B) is a waveform of the detecting voltage in an alternating current magnetic field according to the present invention.

FIG. 16 (C) is a characteristic diagram showing the switching effect according to the present invention.

FIG. 19 (B) is a block diagram of an electronic timepiece according to the present invention.

FIG. 20 (B) is a circuit diagram showing one embodiment of a control portion of FIG. 19 (B).

FIG. 21 (B) is a circuit diagram showing one embodiment of a control portion whose input is as shown in FIG. 21 (A).

FIG. 22 (B) is a circuit diagram showing an embodiment of a control portion whose input is as shown in FIG. 22 (A).

DETAILED DESCRIPTION OF THE INVENTION

Figure 1A:
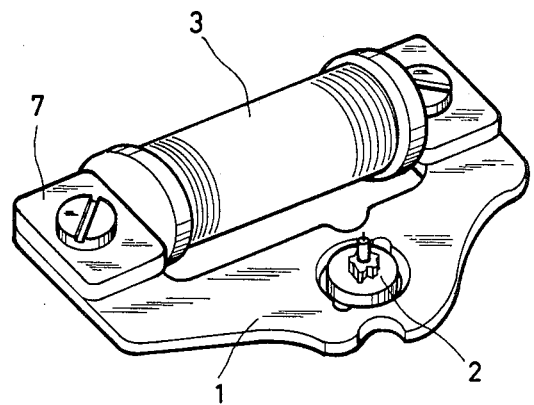
FIG. 1 (A) and FIG. 1 are a perspective view of a conventional step motor for an electronic time piece and a driving pulse waveform therefor.
Figure 1B:
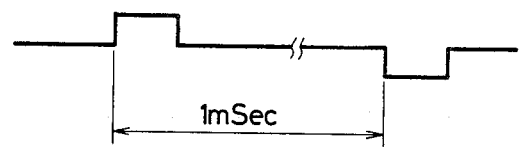
Figure 2:
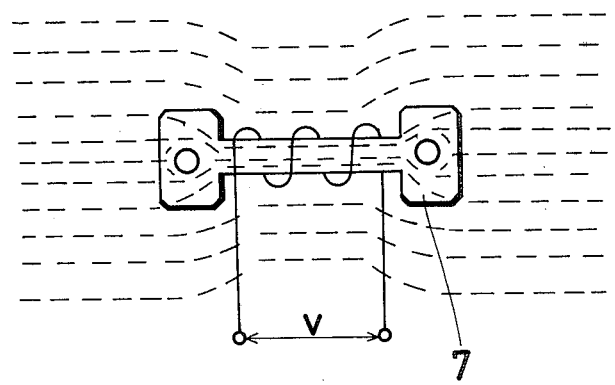
FIG. 2 is a plan view showing the state of the magnetic core and the magnetic field of the motor of FIG. 1A.
Figure 3:
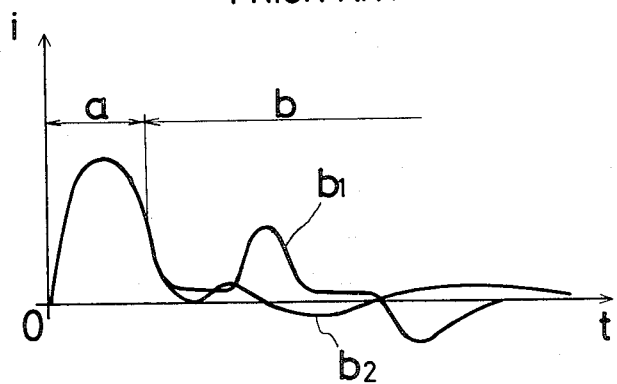
FIG. 3 is a graph of the current waveform of the step motor of FIG. 1A.

FIG. 2 is a typical drawing of a coil and a magnetic core of a stator.

A coil used for a step motor normally has a slender form. Therefore, the external magnetic field is concentrated easily in the coil, and about ten times-flux density is obtained though there is a difference due to the form.

A voltage "v" induced in the coil 3 at this time is given by the formula: $v = n - n \cdot d\phi/dt$ ... (1), in which the number of turns of the coil 3 is and the flux of the magnetic core 7 is $\Phi$.

| material of magnetic core | 45 permalloy |
| --- | --- |
| length of magnetic core | 12 mm |
| cross-sectional dimension of magnetic core | 0.8mm × 0.8mm |
| number of turns of the coil | 10,000 turns |

Supposing that the flux density in the magnetic core becomes ten times that of the exterior when a magnetic core formed as shown in the table 1 is used, the flux of the magnetic core is given as a formula as follows:

$$\Phi = 10 \times S \times B \times \sin \omega t \ldots \quad (2)$$

in which "S" is the cross-sectional dimension, "B" is the peak value of the flux density of the alternating current magnetic field in gauss.

$$\begin{aligned} v &= -10 \times n \times S \times B \times \omega \times \cos\omega t \\ &= -10 \times 1 \times 10^4 \text{(turns)} \times 0.64 \times 10^4 (m^2) \times B \times 10^{-4} (wb/m^2) \\ &\quad \times 2\pi \times 50(Hz) \times \cos\omega t = -6.4 \times 10^{-2} \times B \times \cos\omega t [v] \\ &= -0.02 \times B \cos\omega t [v] \end{aligned}$$

This formula is obtained by formula (1) and (2).

Therefore, if the flux density "B" of the external magnetic field is 2 gauss, v is $-0.4 \cos\omega t [v]$.

For detecting the external magnetic flux density and for controlling a driving pulse of a step motor, a voltage generated in this coil must be detected.

EMBODIMENT 1

By adding an alternating current magnetic field detecting circuit to said conventional supplemental driving system before impression of a driving pulse, this invention is achieved.

Figure 4A:
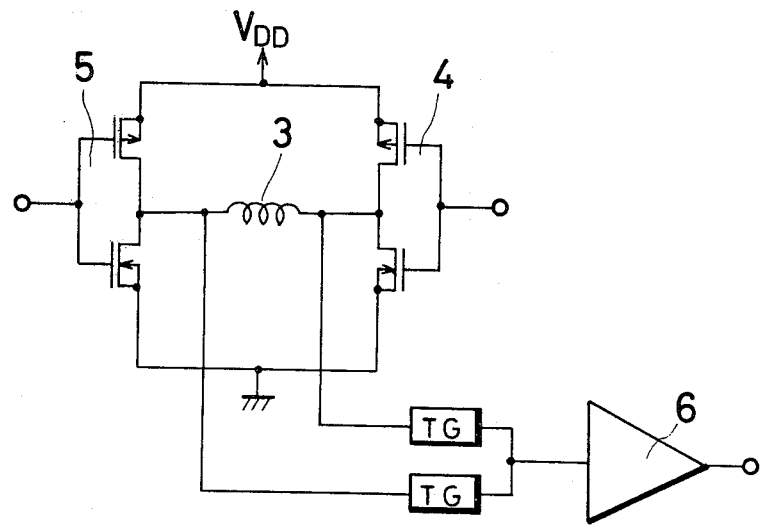
FIGS. 4A and 4B are two embodiments of a driving circuit and a detecting circuit according to this invention.
Figure 4B:
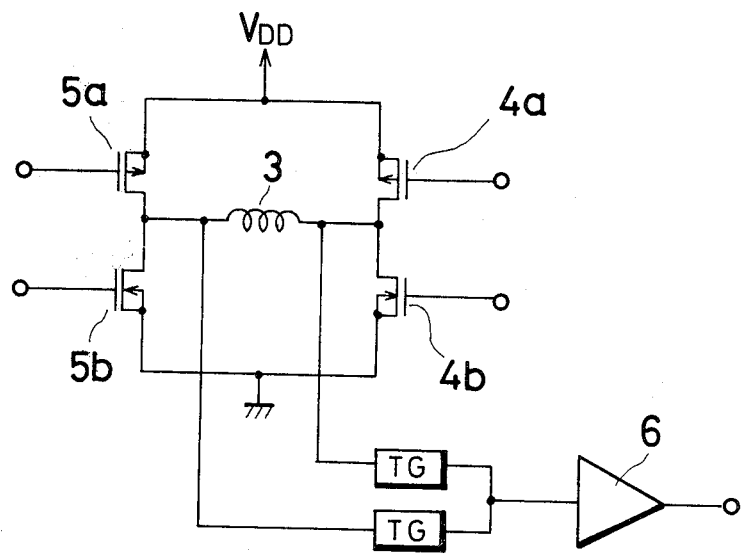

The detection of an external magnetic field is executed by detecting a voltage generated in the coil 3 with a voltage comparator 6 via a transmission gate TG before the impression of a driving pulse in the circuit of FIG. 4 (A) using inverers 4,5.

FIG. 4 (B) is a detecting circuit according to FIG. 4 (A) in which the P-channel electric field effect transistors 4a,5a and the N-channel electric field effect transistors 4b,5b which form inverters 4,5 respectively have their inputs unconnected so that 3-states are obtained, by which both of gates become under the OFF condition. And when the entering of a timepiece in the magnetic field is detected, the coil 3 opens and the sensitivity of detection of magnetic field is improved. The other operations except the operation above noted are the same.

Figure 5:
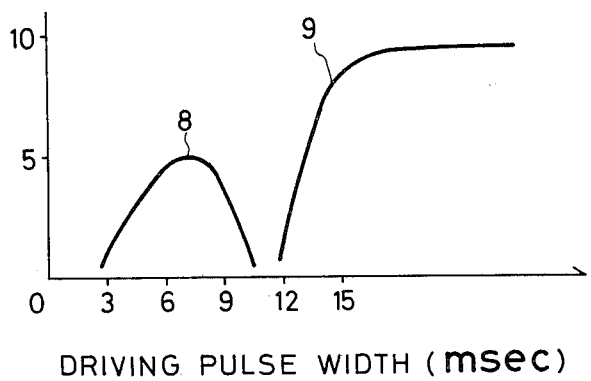
FIG. 5 is a characteristic curve of an anti-alternating current magnetic field characteristic and pulse width.

FIG. 5 shows how to change the alternating current anti-magnetic characteristic when a width of a driving pulse of a step motor is changed.

In this invention, when a timepiece enters a magnetic field, the step motor can be driven with a pulse width at a peak of a domain 8 or a pulse width of a domain 9, and the alternating current anti-magnetic characteristic can be improved.

Figure 6:
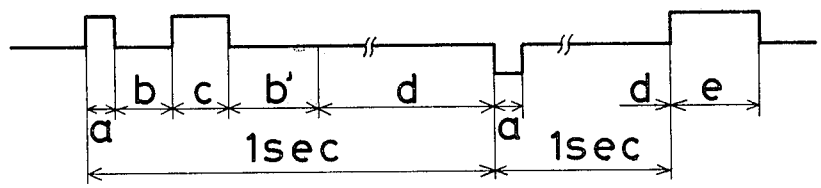
FIG. 6 is a waveform of the driving pulse of a conventional correction pulse system.

The driving pulse time chart at this time is shown in FIG. 6 wherein "a" is a normal driving pulse, "b" is a time of detecting rotation of a rotor, "c" is a correction pulse used when the rotor does not rotate with "a", "b" is a rest time of the rotor and "d" is a magnetic field detecting time. Further, when a timepiece is judged to be in the magnetic field during "d", an operation is executed with a driving pulse "e" having a longer pulse than "a" and "c".

EMBODIMENT 2

A second embodiment is now referred to in which improvements are made in the treatment of information regarding rotation and non-rotation and in a method of amplification of a detection signal.

Figure 7:
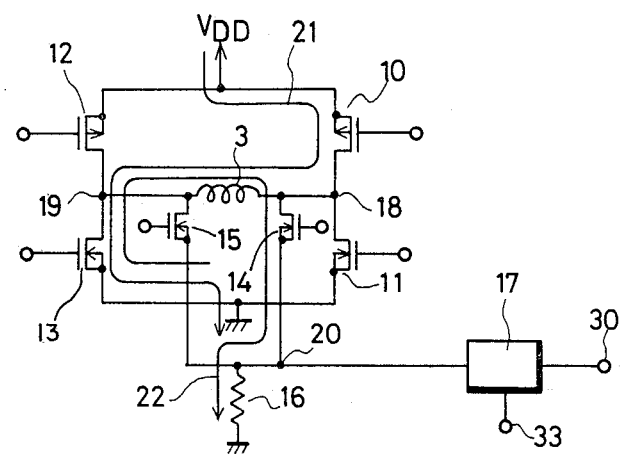
FIG. 7 is a circuit for drive-detection according to this invention.

A circuit of FIG. 7 shows a driving portion and a portion for detecting rotation and non-rotation and a portion for detecting a magnetic field. According to this invention, another amplifier is not necessary by impressing a voltage induced in the coil to a high impedance element intermittently and all of the circuits can be constructed in an integrated circuit very easily, and there is no main cause is no main cause of increased cost; only the size of the I.C. is made slightly larger and stability of the operation is assured. Therefore, this method is very advantageous for putting in a timepiece.

The principle of a detecting signal of this invention is now referred to.

P-MOSFET gates (hereinafter referred to as "gate") 10 and 12 and N-MOSFET gates (hereinafter referred to as "gate") 11 and 13 shown in FIG. 7 constitute gates which are the same as the ones which composed driving inverters 4 and 5 in FIG. 4 (A) of a conventional example. Output terminals 18 and 19 of the driving inverters are connected to a coil 3 and also connected to a high impedance element, i.e., a detecting resistor 16 is connected to the resistor via gates 14 and 15. A connecting point 20 of the detecting resistor 16 is connected to an input terminal of a binary value-logic element 17 having a predetermined threshold voltage.

Figure 8:
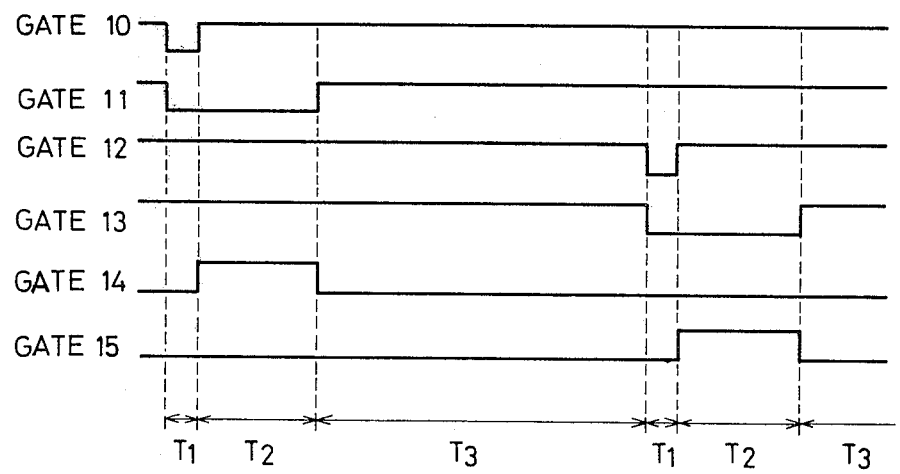
FIG. 8 is a time chart showing one example of a signal at each point of FIG. 7.

FIG. 8 shows input signals at each gate 10–15. A driving pulse is impressed on the coil during period $T_1$. As only gate 10 and gate 13 are under the ON-condition, a current flows from an electric source VDD as shown by an arrow 21. Supposing that only gates 14 and 13 are under the ON-condition as shown in time $T_2$, at this time, a closed loop 22 comprising the coil 3 and detecting resistor 16 is formed.

When an induced voltage in the coil 3 made by a rotation of the rotor 2 is "e", a combined internal resistance of the coil 3, the gate 14 and the gate 13 is "r", the resistance of a detecting resistor 16 is "R", voltage $V_{20}$ of a connecting point 20 is:

$V_{20} = eR/(R+r)$, if $R > r$, $V_{20} = e$. Therefore, if $R > r$, $V_{20}$ can be considered as the induced voltage of the coil.

Figure 10:
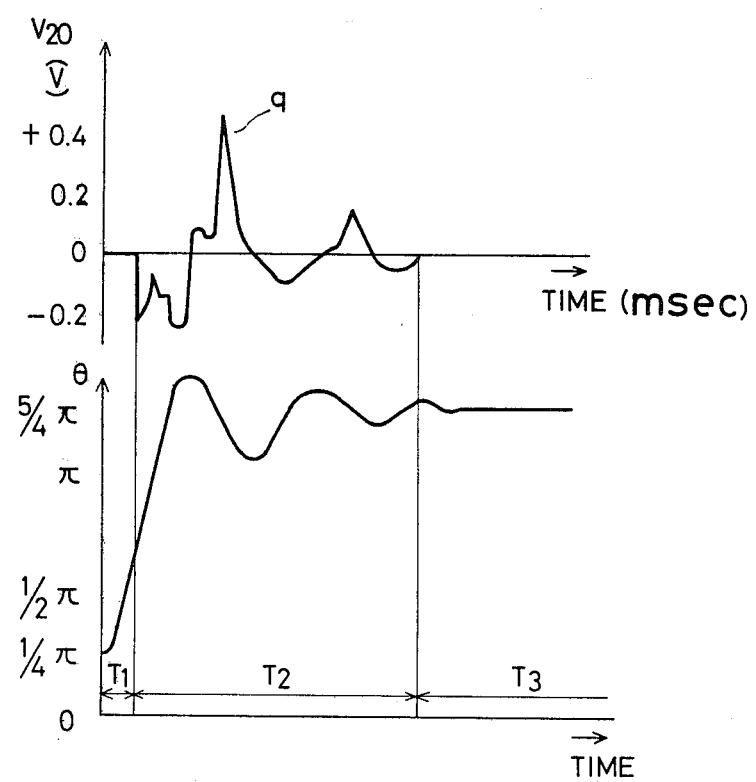
FIG. 10 is curves showing the response of the detecting voltage and rotation angle of the rotor.

FIG. 10 shows one example of the waveform of $V_{20}$, for which the detecting resistance is 50 kΩ, the coil resistance is 2.8 KΩ, the number of turns is 9800, and the step motor is in an almost non-loaded condition. For this induced voltage waveform, a rotation angle is supposed to be shown in FIG. 10. As the load of the step motor increases, the peak of the induced voltage wave falls gradually so as to keep a similar figure, and the vibration cycle becomes longer.

Figure 11:
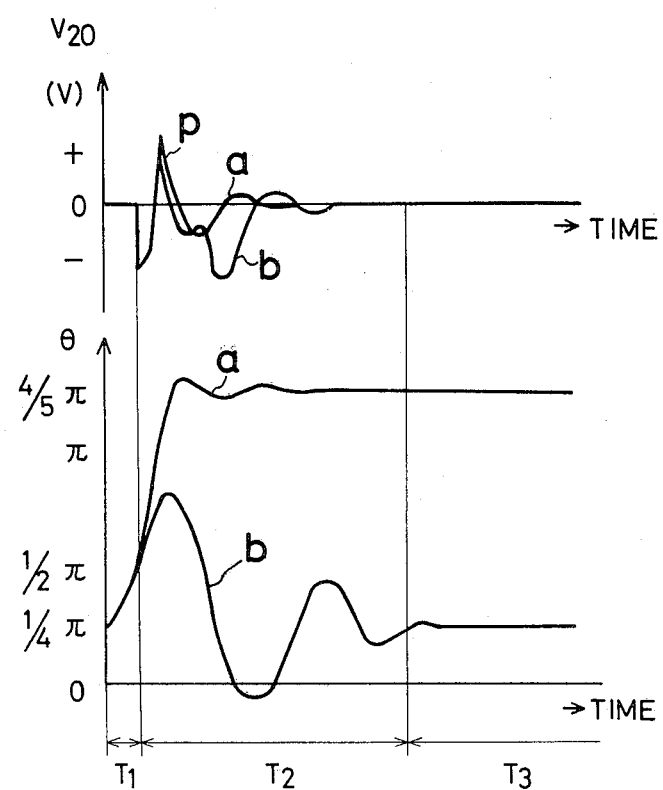
FIG. 11 is curves showing differences between rotation angle and detecting voltage in the rotation and non-rotation condition of the rotor.

In FIG. 11, the induced voltage waveform and the rotation angle of the rotor at the moments of the maximum load and overload are shown as "a" and "b" respectively.

At the moment of the maximum load, the rotation of the rotor is slow, and as there is no vibration after one stepping rotation, whereby an irregularity of the induced voltage is very small. At the moment of overload "b", a high peak voltage in a negative direction is induced when the rotor comes back to the starting position.

Further, there are many ways and means of discriminating a rotation and non-rotation condition by an induced voltage waveform, however the best way thereof is to judge an existence of a peak "q" shown in FIG. 10 because of the simplicity and the certainty of the circuit.

A detection is started from after several milliseconds for preventing a mistake by detecting the peak "p" after an impression of a driving pulse, further the induced voltage attains a predetermined level whereby the rotor is judged to be in non-rotation condition. However, in this method, although the rotor rotates at the moment of the maximum load, it's judged to be at non-rotation. But when this detecting circuit is used in a correction driving system, the rotor does not rotate exceedingly, only correction pulses in the same direction come out abundantly.

An elemental principle of an operation of detection of this invention is as mentioned above.

The effect of intermittently switching a high impedance element and a low impedance element after impression of a driving pulse, which in this embodiment is a high resistance circuit and a low resistance circuit, is now referred to.

Figure 9:
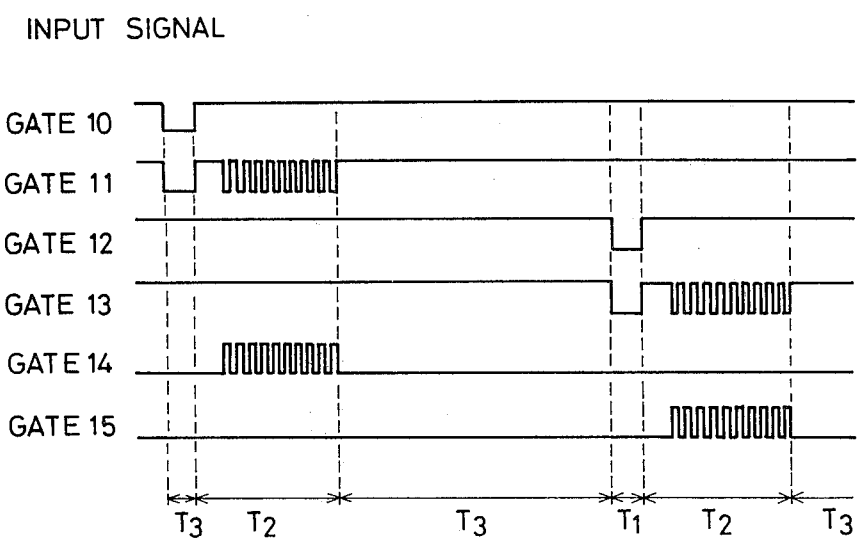
FIG. 9 is a time chart showing another example of a signal at each point of FIG. 7.

In a mode shown in FIG. 7, a high resistance detecting resistor 16 is connected in series besides the driver circuit, and the current in the braking circuit is smaller in comparison with the case without the detecting resistor 16. The two circuits are switched during the braking term of the rotor. A time chart at this time is shown in FIG. 9. By operating in the above noted condition, an abrupt change of current occurs in the braking circuit. However, a coil of the motor can not follow the change of current because its inductance is bigger, and a response of a first-order lag of a time constant $\tau = L/R$ by a resistance "R" of the braking circuit and an inductance "L" of the coil is shown.

Then, a voltage generated at the both sides of the detecting resistor 16 is several mV in the braking circuit shown in FIG. 4 (A). But in a circuit shown in FIG. 7, since coil 3 has the intention to continue current flow during the braking term, at both sides of the detecting resistor 16, which has rather high resistance, the peak voltage 2 v is generated at the instant of the change to the braking circuit which passes through the detecting resistor 16.

Thereafter, this voltage decreases with said time constant $\tau$, and becomes a voltage of the voltage waveform shown in FIG. 10. A voltage wave form of this moment is shown in FIG. 12.

Figure 12:
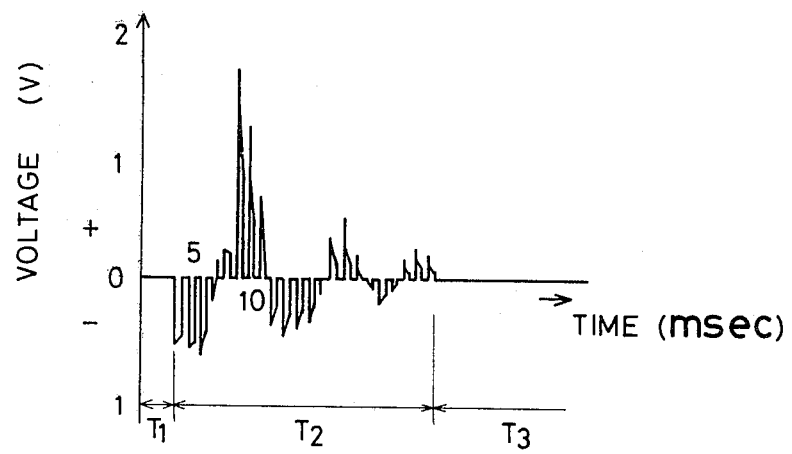
FIG. 12 is a waveform of the detecting voltage according to this invention.

A distinctive feature of this invention consists in the amplification of a voltage which is induced by the motor during the braking term only by changing the resistance value of a circuit which executes the rotor's braking, that is, a peak voltage shown in FIG. 12 which is more than 1 volt, though the peak voltage 9 of the wave form shown in FIG. 10 is about 0.4 volt.

Since a peak voltage more than 1 volt is obtained in this embodiment, a voltage 0.5-1.0 V which is the highest sensitivity of a comparator can be used. Therefore, a design of a converter becomes easy and the area of an inverter in an integrated circuit becomes smaller.

Further, a binary logic element 17 shown in FIG. 7 can be composed of an inverter which is an element of the simplest composition in C-MOS circuiting, and can be applied directly in an input of a flip-flop.

In this embodiment, a design of a binary logic element for detection is difficult when the detecting resistance is too small since a detecting signal is low. And a resistance value is more than a certain value, a detecting voltage does not increase because electric generation power is constant. According to an experiment, in a motor of which the coil has an inductance of 11 henry, and a coil direct current resistance of 3kΩ, when a braking circuit is switched on at a frequency of 1 m sec, and a duty cycle of 50% after impression of a driving pulse, a peak voltage at a detecting resistance of more than 20kΩ, the peak voltage was 1.5 v, and in the detection using a comparater whose threshold voltage is 0.5 v, when 90% of the output which becomes unable to rotate is output, a detecting signal can be already output. For that, by the method in which a pulse has a short width in a normal state and a correction drive is executed as soon as the load is judged heavy by an output of a detecting circuit according to this invention, that is, by an application of this method to a low electric power driving system, a very stable operation is obtained and the circuit construction can be simplified, and only a gate circuit for pulse composition is a little intricate as for a factor of enlargement of an integrated circuit. Further, the operation of the detecting circuit is very stable because it does not contain a condenser and it contains only a resistor whose tolerance is big and is an analogue element, and all of these are digital elements.

The operation of amplification of a signal by switching a loop of a high resistance and a loop of a low resistance is now explained.

Figure 13:
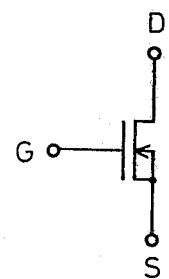
FIG. 13 is a symbol of an N-channel transistor.
Figure 14:
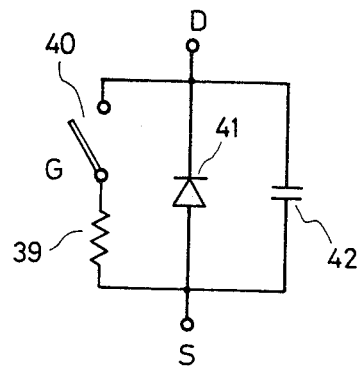
FIG. 14 is an equivalent circuit of an N-channel transistor.

FIG. 13 is a representation of an N-gate and FIG. 14 is an equivalent circuit thereof. A switch 40 operates ON and OFF by a gate signal. Numeral 39 is a resistor in the ON condition of the gate, numeral 41 is a diode between source and a drain connected by P-N connection. Condenser 42 has the sum total of the P-N connection's capacitance between the source and the drain, the capacitance between the drain and the gate, a pad capacitance and a suspended capacitance etc.

Figure 15:
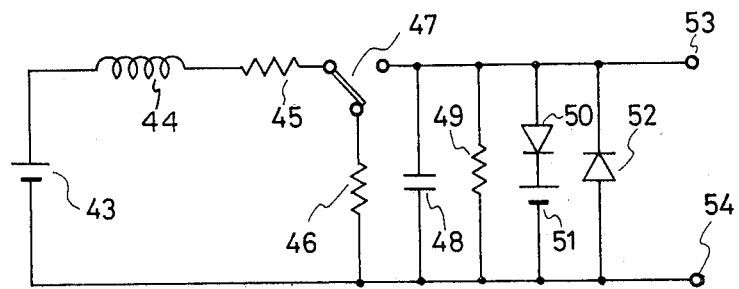
FIG. 15 is an equivalent circuit according to this invention.

An equivalent circuit of this detecting method is as shown in FIG. 15 if this equivalent circuit is replaced by the P-gate and N-gate of FIG. 7 and a battery is assumed to be a condenser of a big capacitance and an ideal electric source.

Numeral 43 is a voltage $V_0$ generated by an external magnetic field or a rotor's vibration, Numeral 44 is a coil constituting a motor of which inductance is L Henry, numeral 45 is the internal resistance of the coil: $r\Omega$, numeral 47 is a loop selecting switch, and 46 is the ON resistance $rN\Omega$ of the N-gate.

However, $rN\Omega$ is neglected because it's smaller enough than the coil's resistance. Numeral 48 is a capacitance which is parasitic on the N-gate and P-gate and is the sum of that of N-gate 24 and P-gate 22, that is C-farad.

Numeral 49 is a detecting resistance: $R\Omega$, numerals 50 and 52 are parasitic diodes between the source the drain of the N-gate and P-gate. Numeral 51 is a drive battery, a silver battery for watches which is generally "$V_D=1.57$ v".

An output voltage of across terminals 53, 54 becomes the detecting voltage "VR" and is applied to a voltage-detecting element.

A response when a selecting switch 47 is changed based on the equivalent circuit of FIG. 15 can be obtained logically.

$$a^2 > b \quad (i)$$
$$V_R = E\left[1 - \left\{\frac{1}{\omega}\left(a - \frac{DL}{r}b\right)\sinh\omega t + \cosh\omega t\right\}e^{-at}\right]$$
$$a^2 = b \quad (ii)$$
$$V_R = E\left[1 - \left(1 + at - \frac{DL}{r}bt\right)e^{-at}\right]$$
$$a^2 < b \quad (iii)$$
$$V_R = E\left[1 - \frac{1}{\omega}\left(a - \frac{DL}{r}b\right)\sin\omega t + \cos\omega t\right]e^{-at}$$

where $$a = \frac{1}{2}\left(\frac{r}{L} + \frac{1}{CR}\right), b = \frac{r+R}{LCR}$$

$$E = \frac{R}{R+r}V_o, \omega = \sqrt{|a^2 - b|}, D = 1 - e^{-\frac{r}{L}t_o}$$

and "to" is a connecting time of a low resistance loop, and "t" is time.

Figure 16A:
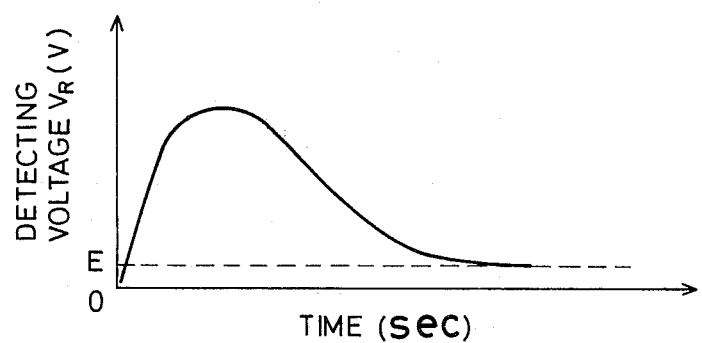
FIG. 16 (A) is an enlarged drawing of a point on the voltage waveform shown in FIG. 12.
Figure 16B:
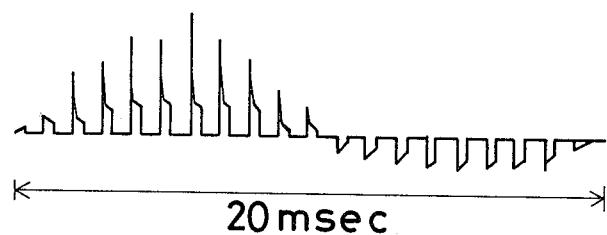
Figure 16C:
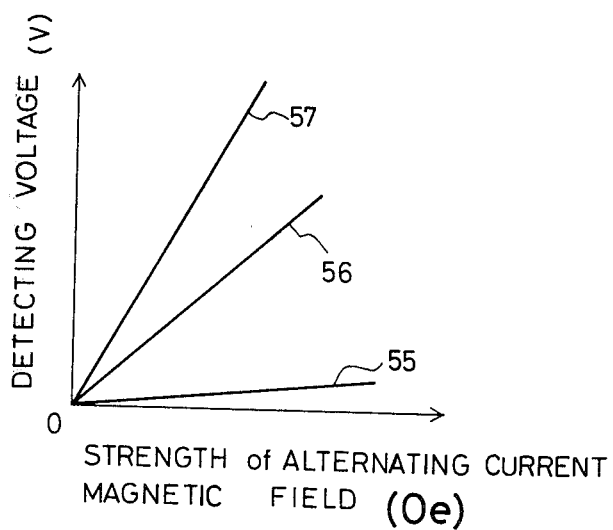

A waveform "VR" of said formula is as shown in FIG. 16 (A). From the calculation based on one of the embodiments, time for $V_R$ to reach the peak voltage is about 30 sec, the peak voltage is 4.2 v, and magnification is about 42 under the following condition:
L=11 henry, C=75 PF, R=150kΩ, r=2.8kΩ, Vo=0.1 V, to = ∞.

Therefore, an amplification of the detecting signal is executed easily without using an analogue signal amplifier. However, it is assumed that "to" = ∞ and the time of the low resistance loop is limitless in this theoretical value, practically, a closed loop of a high resistance and a closed loop of a low resistance are switched alternatively. The time until the constant voltage by the high resistance loop is rather fast, but by the low-resistance loop, the time-constant is big and the time until the constant voltage is slow.

In the case of the closed loop by a high resistance, "VRS" becomes almost the constant voltage after about 0.2 m sec. and in the case of the low-resistance loop, the time constant thereof is gotten by $\tau = 1/r$; $\tau = 3.9$ m sec. Therefore, if the low resistance loop is continued for 3.9 m sec, only 63% of the constant voltage is obtained.

When this system is used as a detecting device of an external magnetic field, it is able to easily detect a magnetic field in the case of a large amplification.

Generally, the frequencies of the alternate magnetic field are 50 Hz or 60 Hz which are the commercial frequencies whose cycle are 20 m sec or 16.7 m sec; and there is the most appropriate switching term for detecting the most powerful magnetic field.

FIG. 16 (B) shows a case in which the high resistance loop time is 0.5 m sec, the low resistance loop time is 1.5 m sec, under said condition, against the alternating magnetic field of 50 Hz.

A detecting signal-amplification factor at this time is about 15 times in the theoretical formula.

FIG. 16 (C) shows this condition, a straight line 55 is a voltage generated in a coil in the case where there is no switching, numeral 56 is a voltage in the case where there is switching and a low-resistance loop time is 0.5 m sec and a high-resistance loop time is 0.5 m sec and whose amplification factor is about 5. Numeral 57 is the characteristic of the case of FIG. 16(B).

As mentioned above, for the detection of the alternating current magnetic field of the commercial frequency, a switching-time a high-resistance loop and a low-resistance loop can not be long. The term of a low-resistance loop is to be longer than that of a high-resistance loop for increasing the amplification rate of a detecting voltage in the sphere.

As noted above, an analogue amplifier which is difficult to be made in C-MOS IC for watches is not necessary because amplification of a detecting signal is executed only with switching of circuits whereby detection of an alternating current magnetic field is performed with a comparator which judges low and high conditions of a voltage compared with the base voltage.

And as the amplification rate of more than 10 times is obtained, a comparison at the threshold voltage of C-MOS inverter is possible, therefore, there is superiority from the viewpoint of power consumption of all of the circuits, constitution of circuits and the area of IC. Though, a resistance element is used as an impedance element for detection in this embodiment, an identical detection is possible with a capacitance-constituent or a inductance-constituent.

Since all of the detecting elements are contained in CMOS IC in this embodiment, a characteristic of a non-saturation portion of a buffer-transistor, as an active element is used.

Though an impedance is used for the above noted description, there is no trouble in using an active element in this way.

However, in the practical construction, it seems to be of general interest that ON-resistance of a buffer-transistor is used as a low-resistance loop, a diffused resistor in IC is used as a high-resistance loop, and a C-MOS inverter or a comparater as a voltage-detecting element.

And although in this invention, a high-resistance is connected thereto in the case of a high-resistance loop, this high resistance can be infinite resistance, it is preferable an open loop. Also, in this case, since there is a parasitic capacitance, it can not be amplified infinitely because of this capacitance-constituent, and a detection as per this description is possible.

In this case, an advantage of simplicity of the timing-consititution of the circuits is produced.

And in the case where a detecting resistance value is small, amplification is not executed in this method.

Generally, in the case where a detecting resistance is higher than 5-times that of the coil-resistance, the amplification rate becomes more than 1.

At the time of the design of a circuit for this method, as a detection system of rotation and non-rotation of the rotor, the important point is the setting of a resistance for detection resistor 16 and the detecting voltage of the voltage-detector. Further, as this detecting circuit is used for the detection of the magnetic field commonly, there is a little factor which causes complication of the composition of the circuits if it's used at the same time, in a step motor which is driven in a correction driving system. And the detecting resisor 16 at the detection of the rotor's rotation and a detector 17 are set at the optimum values in consideration of the inductance of the step motor, direct current resistance and the magnetic circuits, etc.

However, since a step motor is easily driven by higher sensitivity of the magnetic-field detection circuit, two kinds of detection-voltages are set, it is able to select two voltages for setting a preferable voltage, i.e., it is set lower in the case of magnetic field detection and it is set higher in the case of the rotation detection of the rotor.

The setting and switching between two values of detection-resistance are possible. Then, in the case of the magnetic field-detection, the sensitivity becomes higher as the detection resistance value becomes bigger. Therefore, establishment of two detection resistances values becomes easier by making a detection resistance value infinite, that is, by making it an open loop at the voltage detection of the coil.

Further, as is clarified by the description of the theoretical formula, amplification rate can be controlled also by the ratio of switching term of a high-impedance loop and a low-impedance loop, sensitivity of the magnetic detection can be risen by making the time of the low-impedance loop longer than that of the high-impedance loop in case of the magnetic field detection. In this case, detection-resistance and the detection voltage are common to both of the detections.

Further the sensitivity of the magnetic-field detection which is as high as possible is required, and it is achieved by a combination of all of said methods.

In the case where an alternating magnetic field is detected, a detection of the rotor's rotation thereafter becomes unnecessary because a driving pulse is determined. In this case, when the rotation-detection circuit operates, induced voltage by an oscillation of the rotor is confused under the influence of an external magnetic field. And as there is a possibility that the rotor is judged non-rotational when it rotates, it might be better that the rotation-detection is forbidden after the detection of the external magnetic field from the view point of the stability of circuit and current-consumption.

EMBODIMENT 3

In the the correction driving system described in the second embodiment, a normal driving pulse-width was fixed. This third embodiment aims to obtain a driving system using a normal driving pulse whose width is made as short at possible for the purpose of lower power consumption of the step motor than that of the system described in the second embodiment.

Figure 17:
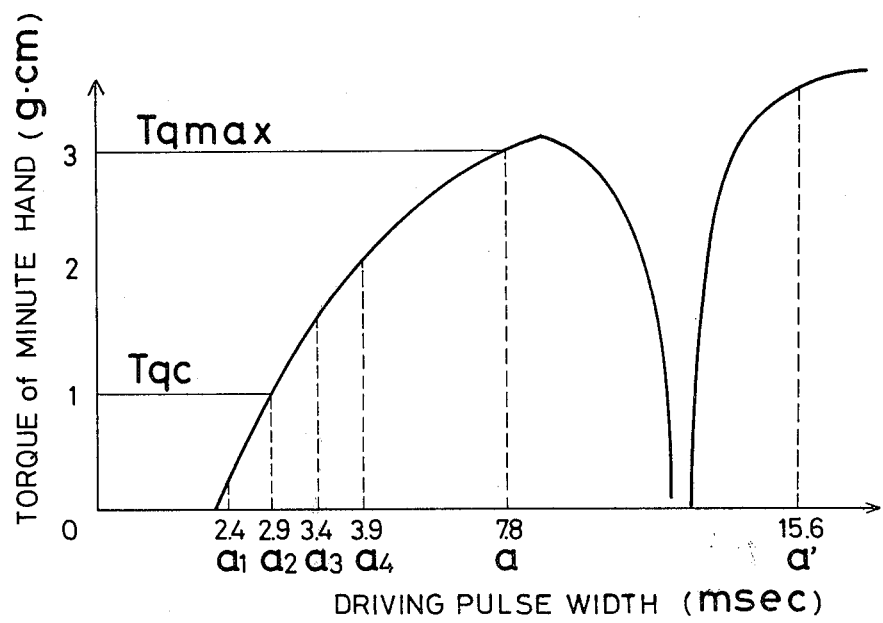
FIG. 17 is a characteristic curve of torque in relation to pulse-width.
Figure 18:
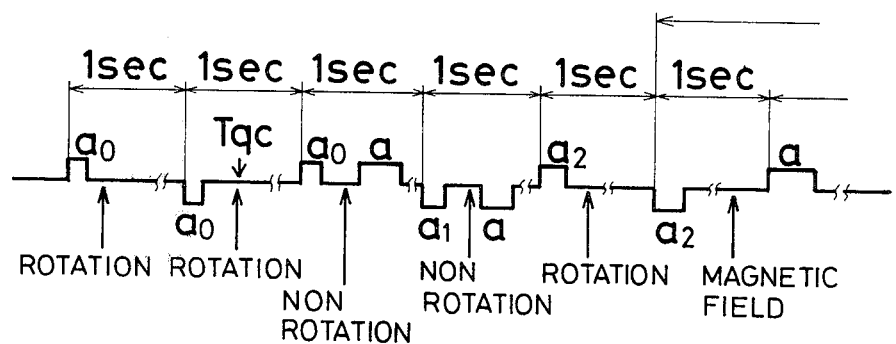
FIG. 18 is a drawing of the waveform of the driving pulse of the correction driving system according to the present invention.
Figure 18:
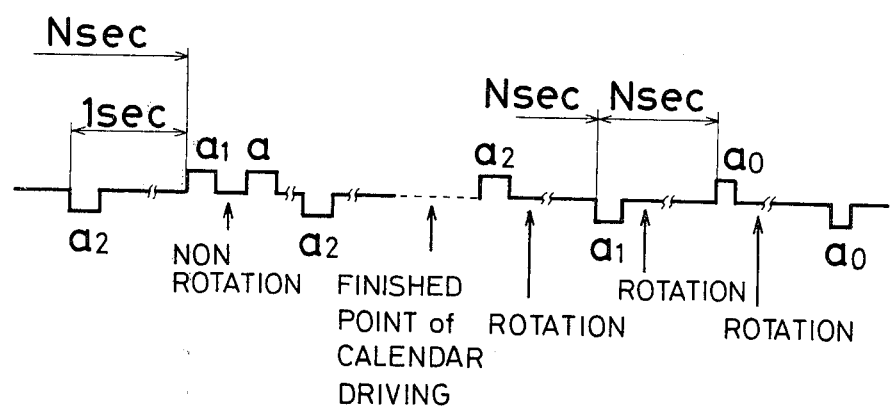

FIG. 17 is a graph showing the relation of a driving pulse-width and the torque of a step motor used in this embodiment. In the case of a fixed pulse driving, the pulse width is set at the point "a" to ensure the maximum torque "$T_q$ max" of the step motor. In the correction driving as noted in the second embodiment, a normal driving pulse-width is set at "a2" or "a3" if the point "Tqc" is the torque which is necessary for calendar-driving. Because, a correction pulse is added when a rotor does not rotate with a normal driving pulse there are many correction pulses which can be impressed thereto, further the current consumption is the addition of the widths of the two pulses. But in the non-load time, the rotor rotates with a pulse-width "$a_0$", practically, and if the driving is executed with said pulse width "$a_0$", a further reduction of electric power is possible. This is the purpose of this embodiment, and the operation thereof is shown in FIG. 18.

Normally, the rotor is driven by a pulse-width "$a_0$". In the case where the rotor does not rotate with the pulse width $a_0$ owing to calendar load, a detecting circuit judges that the rotor does not rotate, and immediately, the rotor is driven by a correction driving pulse. A pulse width at this time is generally shown as "a" in FIG. 17. The next driving pulse-width "$a_1$", after one second, is slightly longer than "$a_0$" and is set automatically as the normal driving pulse, then the driving pulse is impressed on the step motor.

However, according to the graph of FIG. 17, calendar torque "$T_{qc}$" is not achieved even if with $a_1$; the rotor stops again and is driven with a correction pulse "a"., the normal driving pulse after one second automatically becomes "$a_2$", an output torque in this case is greater than the calendar torque "$T_{qc}$", the step motor is driven with a pulse-width "$a_2$".

However, the pulse width "$a_2$" continues even if the calendar load disappears and it's a disadvantage for the reduction of power consumption. So, by adding a circuit which shortens the driving pulse every N Seconds, the pulse is returned to a pulse-width "$a_1$" after N times of continuous outputs of "$a_2$". Further, it becomes "$a_0$" if "$a_1$" is continuously output N-times.

According to the driving like this, a conventional step motor can be driven with lower electric consumption. As shown in FIG. 5, as the pulse-width is shorter the alternating current anti-magnetic charasteristic becomes worse. However, as mentioned in the above embodiments, in the present invention, a magnetic field-detecting device is operated before impression of a normal driving pulse and if the condition of being in a magnetic field is acknowledged, this correction driving circuit is inhibited, a normal driving pulse-width is set at the peak point of a region 8 or a region 9 of FIG. 5, that is, at the maximum point of the antimagnetic characteristic.

Therefore, a step motor is obtain which is hard to stop by an external influence and whose electric consumption is reduced, and miniaturization is achieved and thickness is reduced because there is no increase in number of parts, and further, in view point of cost, it has an advantage because the anti-magnetic structure does not have to be firm.

Influence of an alternating current magnetic field in this invention is mentioned above. In the case of a direct current magnetic field, a mis-operation in the judgement of rotation and non-rotation does not, because, a voltage is generated in a coil by the effect of an alternating current magnetic field and a voltage is not generated in a coil by the effect of a direct current magnetic field.

The description of this invention was made about a step motor of one-piece stator, but a similar effect is also obtained by using any step motors whose stator is employed as a separate type or a mono-phase driving step motor.

Figure 19A:
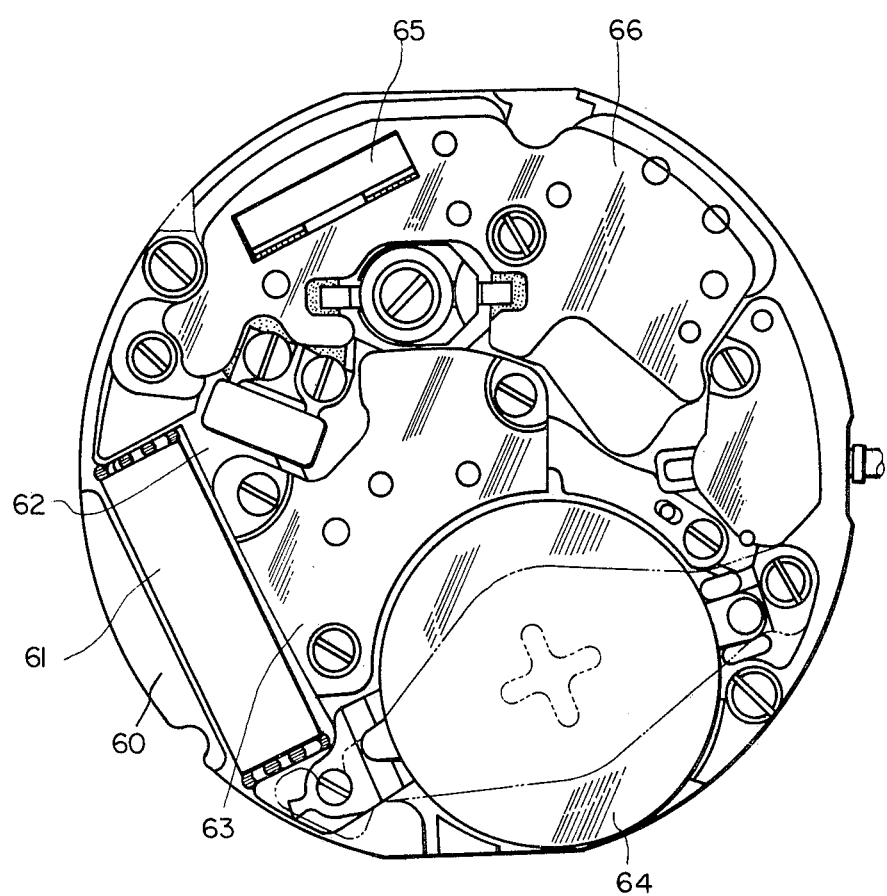
FIG. 19 (A) is a plan view of an electronic timepiece.
Figure 19:
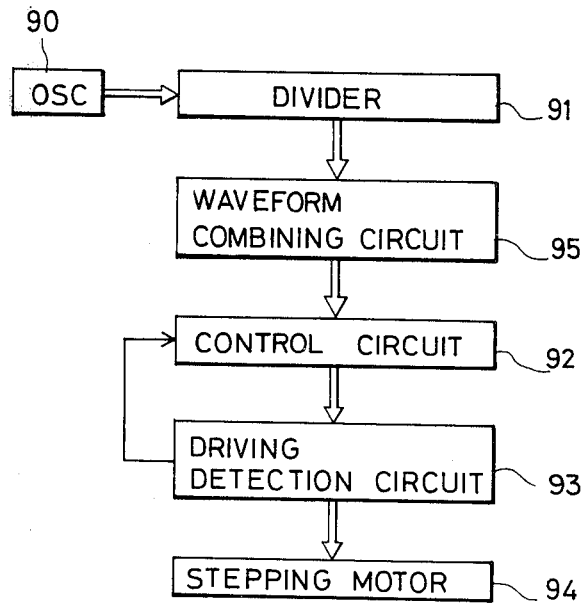

FIG. 19 (A) shows an example of an actual watch where a device of the present invention is mounted.

Numeral 60 is a base plate, numeral 61 is a coil which is a party of the step motor, numeral 62 is a stator which is part of the step motor, numeral 63 is a supporting member for a rotor and gear wheels. Numeral 64 is a battery, numeral 65 is a quartz-crystal oscillator, numeral 66 is a circuit block on which an IC is mounted and which is molded of resin, and among the embodiments (1), (2) and (3) according to the present invention, merely their IC are different respectively.

FIG. 19 (B) is a block diagram for showing an whole electronic timepiece.

As an oscillation section 90, a quartz-crystal oscillator of 32,768 Hz is used conventionally, a dividing section 91 produces a base signal of 1 Hz by 15 stage of dividing of the signal of 32,768 Hz. A waveform combining circuit 95 puts out pulses of different widths which are necessary for detecting and driving etc.

A control circuit 92 impresses different driving pulses on a driving and detection circuit 93 according to the existence and non-existence of a detecting signal and drives the step motor 94 with a pulse having a width which suits each condition.

Figure 20A:
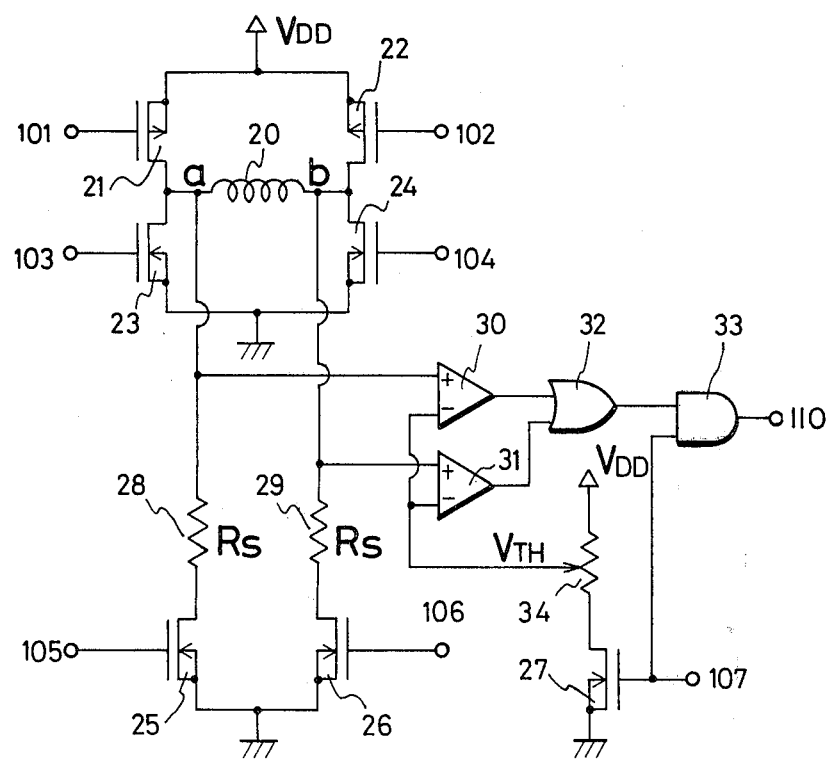
FIG. 20 (A) is a circuit diagram of the driving-detecting portion of FIG. 19 (B) according to the invention.
Figure 20:
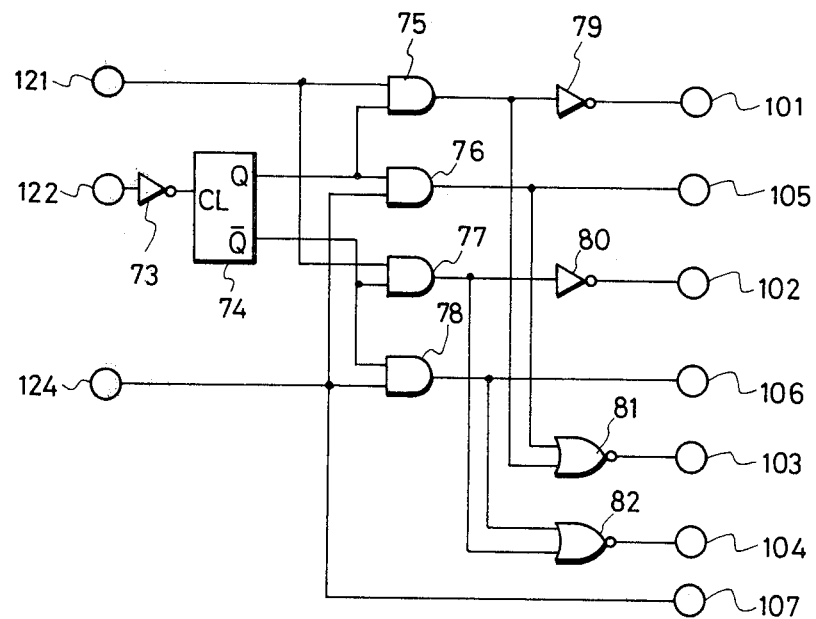

FIGS. 20 (A), (B) show the examples of a driving-detecting circuit shown in the block scheme of FIG. 19 (B). P-gates 21, 22 and N-gates 23, 24 constitute two pairs of CMOS inverters, and each output "a" and "b" are connected to both terminals of a coil 20 and at the same time, they are connected to one terminal of detecting resistors 28, 29. The other terminals of detecting resistors 28 and 29 are connected to source inputs of N-gates 25 and 26. Each positive input terminal of voltage-comparators 30,31 are connected to terminals "a", "b" of the detecting resistors 28 and 29, and each negative terminal is connected to a dividing point of a base voltage resistor 34 and both of outputs of the comparators 30, 31 are connected to OR-gate 32.

One terminal of base voltage resistor 34 is grounded via N-gate 27. The input terminals of AND gate 33 are connected to the output of OR gate 32 and the gate terminal of N-gate 27. Gate terminals 101, 102, 103, 104, 105, 106, 107 of P-gates and N-gates 21, 22, 23, 24, 25, 26, 27 and an output terminal 110 of AND gate 33 are connected to a control circuit 92. Terminals having the same numerals in FIGS. 20 (A) and (B) are connected to each other.

Flip-flop (referred to as "FF" hereinafter) 74 is a negative-edge-trigger type and connected from a phase control terminal 122 to a clock input CL via an inverter (referred to as NOT hereinafter) 73, an output "Q" of FF 74 is applied to AND gate (referred to AND hereinafter) 75, AND 76, and an output $\overline{Q}$ of FF 74 is applied to AND 77 and AND 78. Driving terminal 121 is applied to AND 75 and AND 77. Detecting signal input terminal 124 is connected to AND 76 and AND 78. An output of AND 75 is connected to a terminal 101 via NOT 79, and is connected to NOR gate (referred to NOR hereinafter) 81. An output of AND 76 is connected to terminal 105 and NOR 81. An output of AND 77 is connected to terminal 102 and NOR 82 via NOT 80. An output of NOR 81 is connected to a terminal 103, an output of NOR 82 is connected to a terminal 104, and detecting signal input terminal 124 is connected to a terminal 107.

Referring now to an operation of FIG. 20 (B). A phase control terminal 122 is an input signal which inverts the sense of a current flowing in a step motor 94, the direction of the driving pulse and detecting pulse for the step motor 94 are inverted with a pulse of positive edge according to NOT 73. Therefore, in the case of a timepiece of a a one second stepping system, one second pulse is applied thereto.

The relation between input and output of FIG. 20 (B) in the case that output Q of FF 74 is "H" (High level voltage) and $\overline{Q}$ is "L" (low) is as follows:

TABLE 2

| FF74 | input terminal | | output terminal | | | | | | |
|---|---|---|---|---|---|---|---|---|---|
|  | 121 | 124 | 101 | 102 | 103 | 104 | 105 | 106 | 107 |
| Q = H | L | L | H | H | H | H | L | L | L |
|  | H | L | L | H | L | H | L | L | L |
|  | L | H | H | H | L | H | H | L | H |
| Q = L | L | L | H | H | H | H | L | L | L |
|  | H | L | H | L | H | L | L | L | L |
|  | L | H | H | H | H | L | L | H | H |

When the first output signal of table 2 is applied in a circuit of FIG. 20 (A), N-gates 23 and 24 go into the ON condition, when a terminal 121 is "L" and a terminal 124 is "L", whereby a loop of low-impedance is made. And, when Q is "H" and the terminal 121 is "H", and the terminal 124 is "L", P-gate 21 and N-gate 24 to into the ON condition, and a current is flowing in the coil 20, and step motor 94 is operated.

When the terminal 121 is "L", the terminal 124 is "H", N-gate 25 and N-gate 24 go into the ON condition, detecting resistor 28 is inserted in a loop and then, it becomes a loop of high impedance. Further, N-gate 107 goes into the ON condition, then, a base voltage is impressed in a negative input of the voltage comparator circuits 30 and 31, and a signal of rotation and non-rotation or a signal of alternating current magnetic field detection is output at a terminal 110.

Figure 21A:
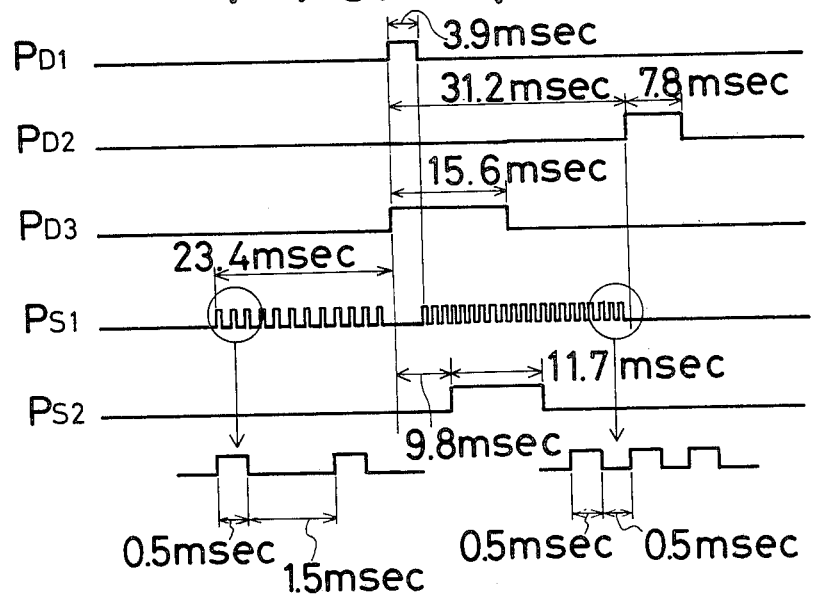
FIG. 21 (A) is a time chart showing one example of an output of a waveform combining portion of FIG. 19 (B).
Figure 21B:
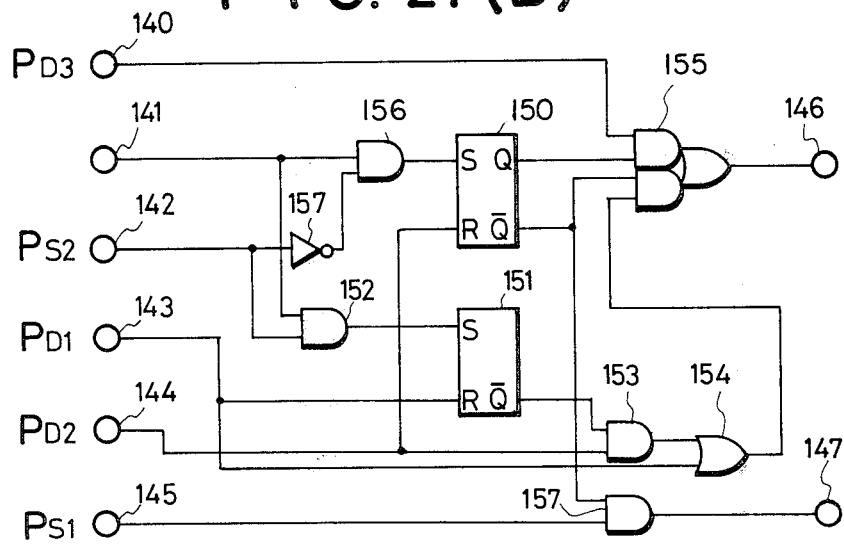

FIG. 21 (B) shows an example of the control circuit 92 of the embodiments (1) and (2). FIG. 21 (A) shows a waveform which is output from the waveform combining circuit 95 and is applied to the control circuit 92 and its waveform combination circuit comprises in a general gate-circuit.

$PD_1$ is a normal driving pulse of 3.9 m sec. PD2 is a normal driving pulse of 7.8 m sec. for a correction drive in the case that a load is bigger than the output torque with a normal pulse of 3.9 m sec. during which the rotor does not rotate. PD3 is a pulse width which is chosen to be the best when for the anti-magnetic characteristic a watch is judged to be in an alternating current magnetic field. This drive is performed with a pulse width of 15.6 m sec. $PS_1$ is not necessary in the embodiment (1) and is a pulse for detection shown in the Figure in the second embodiment. PS2 is a signal for designating a period in which rotation and non-rotation of the rotor is detected. Each of the pulses of FIG. 21 (A) are applied to input terminals of FIG. 21 (B). PD3 is applied to a terminal 140, PS2 is applied to a terminal 142, PD1 is applied to a terminal 143, PD2 is applied to a terminal 144 and PS1 is applied to a terminal 145. An output signal from a detecting circuit is applied to a terminal 141. The terminal 141 is connected to S-input of SR-FF 150 via AND 156 and is connected to AND 152. A terminal 142 is applied to AND 156 via NOT 157 and at the same time, to an input of 152, an output of AND 152 is applied to the S-input of SR-FF 151. A terminal 143 is connected to the "R" input of SR-FF 151 and to OR-gate (referred to as OR hereinafter) 154. An output $\overline{Q}$ of FF 151 is connected to AND 153, whose output is applied to OR-154 and the output of OR-154 is applied to AND-OR 155. The outputs Q, $\overline{Q}$ of SR-FF 150 are connected to AND-OR 155, and the output of AND-OR 155 is connected to a driving pulse output terminal 146.

The Q output of FF-150 is applied to AND-157. The terminal 145 is regenerated at terminal 147 via AND-157, and if a magnetic field is detected, FF-150 is set immediately and all detections are inhibited.

In normal operation, as there is no external alternating current magnetic field, there is no output from the magnetic field detecting circuit and SR-FF 150 is not set. Therefore, PD1 of 3.9 m sec. is generated at a terminal 146 via OR 154. Hence, if a rotation signal of the rotor is applied to a terminal 141, SR-FF 151 is set and $\overline{Q}$ becomes "L", and PD2=7.8 m sec. is not generated at the terminal 146. However, in the case where the rotor doesn't rotate, as a signal doesn't come in the terminal 141, SR-FF 151 is not set, and $\overline{Q}$="H". For that case, PD2=7.8 m sec is generated at terminal 146 via AND 153, OR 154, and AND-OR 155.

When a watch encounters an alternating current magnetic field, as a detecting signal is applied to terminal 141, SR-FF 150 is set, and as "Q" go into the condition "H", a signal of 15.6 m sec at terminal 140 is generated at terminal 146 via AND-OR 155.

The terminal 146 is connected to an input terminal 121 of the driving circuit, and terminal 147 is applied to terminal 124 of the driving circuit, and the drive of the step motor is insured with a pulse whose width is 15.6 m sec.

Figure 22A:
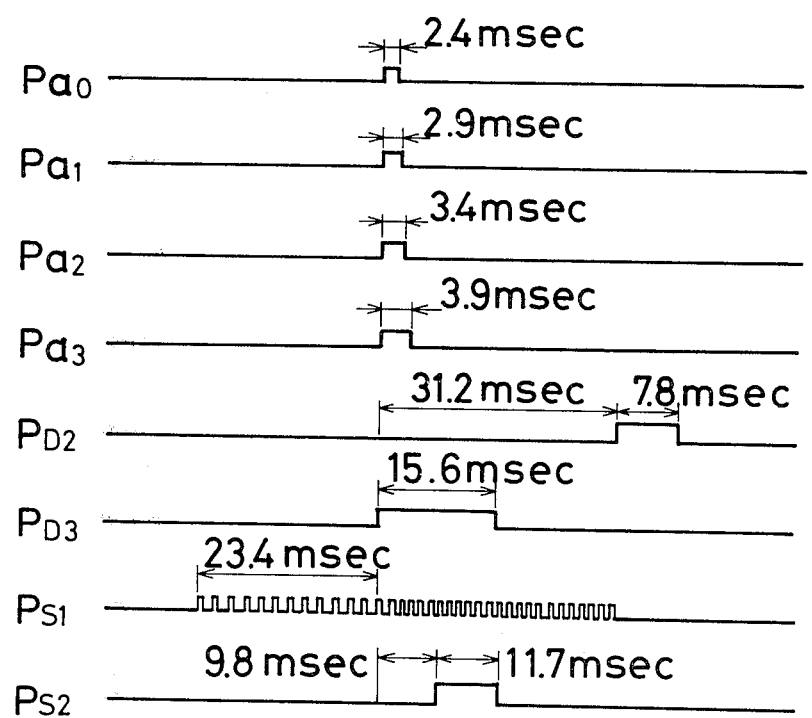
FIG. 22 (A) is a time chart showing another embodiment of the output of the waveform combining portion of FIG. 19 (B).

One example of a circuit according to the embodiment (3) shown in FIGS. 22A and 22B is now referred to.

Figure 22:
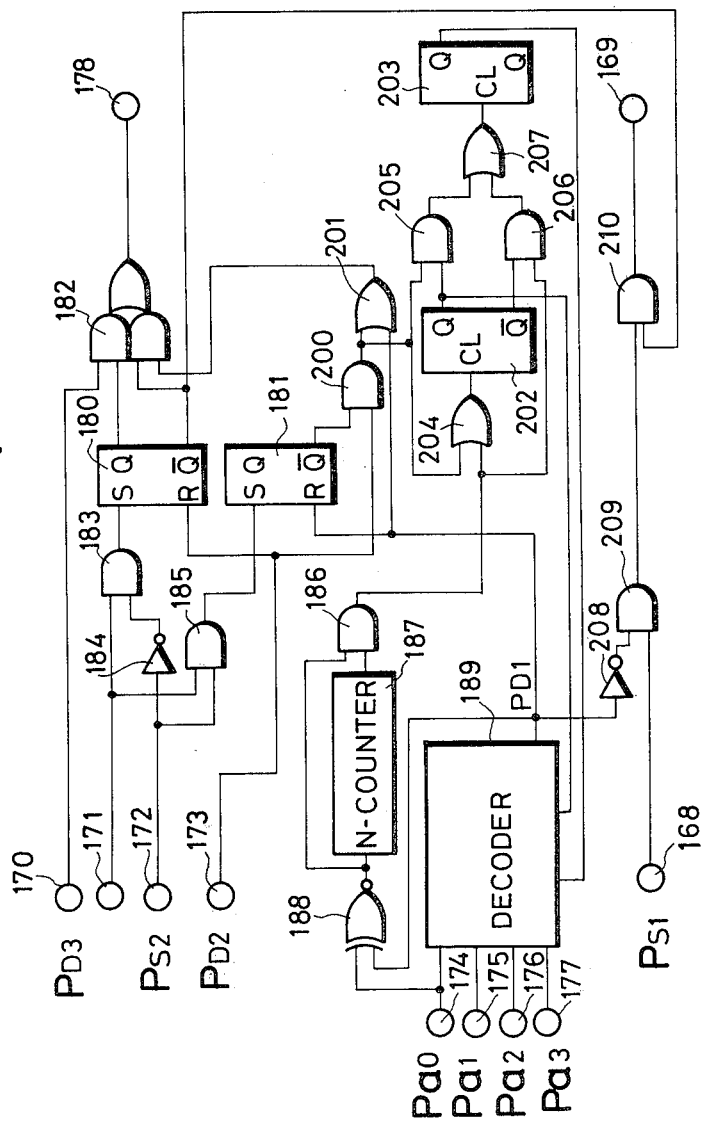

FIG. 22 (B) is an example of a control circuit 92 designed based on the step motor shown in FIG. 17. A wave form whose time chart is as shown in FIG. 22A is generated from waveform combining circuit 95 shown in FIG. 19. The waveform combining circuit 95 comprises an appropriate combination of gate circuits whose inputs are signals which are generated from the dividing circuit 91.

Referring now to the time chart shown in FIG. 22 (A), $Pa_0$=2.4 m sec., $Pa_1$=2.9 m sec., $Pa_2$=3.4 m sec. and $Pa_3$=3.9 m sec. are normal driving pulses and one of these pulses is chosen automatically according to the load of the step motor and becomes normal driving pulse $PD_1$. Further $PD_2$ is a correction pulse for redrive in the case where the rotor doesn't rotate by the normal driving pulse $PD_1$ and the maximum torque is assured with a width of 7.8 m sec.

The width of $PD_3$ is set so that it may be strongest when a watch is judged to be in a magnetic field, namely, it is 15.6 m sec.

$PS_1$ is an input pulse for detection with an "L period"=0.5 m sec., an "H period"=1.5 m sec and a duty cycle of 1:3 in the case of an alternating current magnetic field detection. In the case of rotation detection, the pulse width is 0.5 m sec. and the duty cycle is 1:1. PS2 is a pulse to designate a period of the detection of the rotor's rotation and detection is begun after impression of normal driving pulse $PD_1$ with the width of 9.8 m sec. PS2 has a pulse width of 11.7 m sec.

An output of the waveform combining circuit 95, which is noted above is connected to a terminal of FIG. 20 (B).

$Pa_0$ is connected to terminal 174, $Pa_1$ to terminal 175, $Pa_2$ to terminal 176, $Pa_3$ to terminal 177, PD2 to terminal 173, PD3 to terminal 170, $PS_1$ to terminal 168, PS2 to terminal 172 respectively, and at terminal 171, a detecting output from a detecting circuit is applied and terminal 178 is connected to terminal 121 of FIG. 20(B), which is circuit of the driving circuit 93, and terminal 169 is connected to a terminal 124 of FIG. 20 (B).

Since the construction and the operation of terminals 170, 171, 172, 173, AND 183, NOT 184, AND 185, SR-FF 180, SR-FF 181, AND-OR 182, AND 200, AND 201 are the same as FIG. 21 (B), description thereof is omitted.

OR 204, AND 205, AND 206, FF 202, FF 203 constitute an up-down counter of 2 bits; an input from AND 200 effecting the up counting mode, and an input from AND 186 effecting the down counting mode, outputs of the counters are $Q_0$, $Q_1$ of FF 202 and FF 203. An output of the up-down counter is connected to a decoder 189, and output $PD_1$ of the decoder is as follows:

TABLE 3

| $Q_1$ | $Q_0$ | $PD_1$ |
|---|---|---|
| 0 | 0 | $Pa_0$ |
| 0 | 1 | $Pa_1$ |
| 1 | 0 | $Pa_2$ |
| 1 | 1 | $Pa_3$ |

A normal driving pulse which is generated from a decoder 189 is equal to the normal driving pulse described in FIG. 21 (A) and is applied to OR 201 and RS-FF 181.

Since the input of a detecting signal is inhibited during the drive by the normal pulse $PD_1$, it is applied to AND 209 via NOT 208, and an output of $PS_1$ doesn't appear at terminal 169 at the time of the impression of normal driving pulse. Since the output of AND 209 is output at terminal 169, if an alternating current magnetic field is detected, all of the detections are inhibited.

$Pa_0$ and the normal driving pulse $PD_1$ are applied to exclusive NOR 188; and an input is inhibited to N-counter 187 when $PD_1$ equals $Pa_0$ and is applied every second to N-counter 187 when $PD_1$ does not equal $Pa_0$. When the N-counter 187 has finished counting N, an output of N-counter 187 goes to the "H" condition, and as a signal synchronized with $PD_1$ is applied to OR 204, the up-down counter is counted down.

In the case where the rotor doesn't rotate, $PD_2$ is generated to AND 200, the up-down counter is counted up, and the width of $PD_1$ is changed into $Pa_1$, $Pa_2$, $Pa_3$ by degrees.

As described above, according to the construction of this invention, a driving system of lower-electric consumption and a device of magnetic field detection are of the same construction. Further, all of the elements for the detections are those which are used conventionally, and the circuit is easily constituted in an integrated circuit, a factor of cost-up is only the size of the chip. However, the above noted construction is not a disadvantage because the size of the chip and cost of the IC are being reduced rapidly according design round and technical innovation.

On the contrary, since it is a low power-consumption-driving system, battery capacity can be reduced for an equivalent battery life and miniaturization of the size of battery can be attained. Further, since the rotor is hard to stop in an external magnetic field, magnetic-proof construction doesn't have to be firm and even the magnetic-proof construction can be omitted. Therefore this invention is effective from the view point of miniaturization, reduction of an thickness, lower-cost, and high quality of electronic timepiece.

We claim:

1. An electronic timepiece comprising in combination: a stepping motor including a stator, a drive coil and a rotor; drive means for driving the stepping motor in one of at least two different states; and means for changing the state of the drive means in response to a change in the load of the motor and in response to the location of the motor in an external magnetic field.

2. An electronic timepiece as claimed in claim 1, wherein the means for changing the state of the drive means includes rotation detecting means for sensing the induced voltage in the rotor to determine a rotation and non-rotation condition of said rotor of the step motor, and detecting means for detecting a voltage induced in the coil by the influence of an external magnetic field.

3. An electronic timepiece as claimed in claim 2, wherein the external magnetic field detecting means and the means for detecting the rotation and non-rotation condition of the rotor comprise a single detecting mechanism.

4. In an electronic timepiece having a stepping motor including a stator, a rotor and a driving coil, the improvement comprising: means defining a periodic normal driving time period for the rotor and a periodic rest time period thereafter in which the rotor is at rest independent of the rotation or non-rotation state thereof; means for producing normal driving pulses and magnetic field correction pulses having greater effective power than the normal driving pulses and present during the normal driving periods; means for detecting an external magnetic field during the rest time periods; and means for driving the coil with the normal driving pulses when no external magnetic field is detected and with the magnetic field correction pulses when an external magnetic field is detected.

5. The timepiece according to claim 4; wherein the detecting means comprises means for sensing a voltage induced in the coil during said rest time period.

6. The timepiece according to claim 5; wherein the sensing means comprises two transmission gates connected to the terminals of the coil and an amplifier connected to the outputs thereof.

7. The timepiece according to claim 5; wherein the defining means includes means defining a periodic detecting time period between the normal driving time period and the rest time period wherein a voltage is induced in the coil when the rotor is in a non-rotation condition due to an increased load; wherein the pulse producing means includes means for producing a load correction driving pulse between the detection time period and the rest time period; means for detecting the non-rotation and rotation states of the rotor during the detecting time period; and wherein the driving means includes means for driving the coil with the load correction driving pulse after the application of the normal driving pulse upon the detection of a non-rotation state.

8. The timepiece according to claim 7; wherein the detecting means for detecting the non-rotation and rotation states includes means for sensing the voltage induced in the coil during the detecting time period.

9. The timepiece according to claim 8; wherein the detecting means for detecting the non-rotation and rotation states includes means for amplifying the induced voltage comprising means for successively switching the coil between a low impedance and high impedance loop during the detecting time period.

10. The timepiece according to claim 8; wherein the means for detecting the external magnetic field and the means for detecting the non-rotation and rotation states are comprised by the same circuitry.

11. The timepiece according to claim 7; wherein the driving means includes means for successively incrementing and decrementing the normal driving pulses in successive normal driving time periods after a predetermined number of normal driving time periods in response to the detection of a non-rotation and a rotation state, respectively.

* * * * *